Dec. 28, 1954   E. A. RUTENBER   2,698,373
COOKING RANGE
Original Filed Feb. 24, 1947   3 Sheets-Sheet 1

INVENTOR.
EDWIN A. RUTENBER
BY Richard A. Parsons

Dec. 28, 1954     E. A. RUTENBER     2,698,373
COOKING RANGE

Original Filed Feb. 24, 1947     3 Sheets-Sheet 2

INVENTOR.
EDWIN A. RUTENBER
BY
Richard A. Parsons

Dec. 28, 1954     E. A. RUTENBER     2,698,373
COOKING RANGE

Original Filed Feb. 24, 1947     3 Sheets-Sheet 3

INVENTOR.
BY EDWIN A. RUTENBER
Richard G. Parsons

United States Patent Office 2,698,373
Patented Dec. 28, 1954

2,698,373
COOKING RANGE

Edwin A. Rutenber, Baldwin Lake, Mich., assignor to Gibson Refrigerator Company, Greenville, Mich., a corporation of Michigan Continuation of application Serial No. 730,357, February 24, 1947. This application July 22, 1950, Serial No. 175,433

4 Claims. (Cl. 219—37)

This invention relates to cooking ranges and more particularly to electric cooking ranges of the type which include a deep well cooker.

The present application is a continuation of my copending application, Serial No. 730,357, filed February 24, 1947, for Cooking Range. The present invention is an improvement on the structure disclosed in my Patent No. 2,416,645, granted February 25, 1947.

The principal object of the present invention is to provide a deep well cooker having a burner which can be moved between deep well cooking position and surface burner position, and in which the burner is more positively and efficiently guided between those two positions than in previous cookers of this type.

Another object of the invention is to provide such a cooker having means for maintaining a burner in substantially a horizontal position while the burner is being raised and lowered.

A still further object is to provide such a cooker having means for automatically seating the burner in its upper position and unseating the same therefrom during the raising and lowering movement of the burner.

Another object is to provide a simple and effective means for guiding the burner between its raised and lowered positions and for preventing the burner from leaving the guideways.

These objects are attained in part by providing guideways for the burner which are inclined throughout substantially their entire lengths between the two positions which the burner occupies. These objects are also attained in part by providing a simple form of disk-like anti-friction means between the movable burner and the deep well cooker wall.

For a more complete explanation of the invention and its advantages, reference should be had to the following description and the accompanying drawings, wherein.

Figures 1, 5:
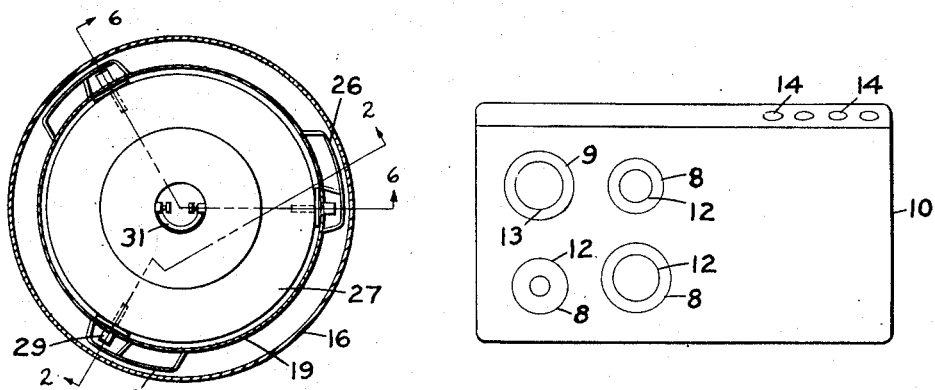
Figure 1 is a plan view of an electric range having a deep well cooker embodying the present invention.
Figure 5 is a cross-sectional view taken on substantially the line 5—5 of Figure 2.

The range shown in Figure 1 is for the most part conventional. It includes a top 10 having three circular openings 8 therein for the reception of conventional surface burners 12. A fourth circular opening 9 is formed in the top 10 to receive a deep well cooker 13. Suitable controls 14 of conventional form are mounted on the top wall for regulating the temperature of the surface burners and the deep well cooker burner.

The opening 9 in the top wall which receives the deep well cooker is provided with an annular rabbet 15 about its periphery. The deep well cooker 13 rests upon the bottom wall of the rabbet 15, as disclosed in Figure 2.

The deep well cooker 13 includes a cylindrical outer sleeve 16, a tubular side wall 19, and a burner 27 movable upwardly and downwardly within the latter. The outer sleeve is closed at the lower end by a bottom wall 17. The upper end of the sleeve 16 is provided with a horizontal annular flange 18.

The tubular side wall 19 is located within and in spaced coaxial relation to the sleeve 16. The upper end of the side wall 19 is provided with a horizontal outwardly extending portion 20 which is provided with a down-turned peripheral flange 21. The flange 21 rests upon the bottom wall of the rabbet 15. The flange 18 of the sleeve 16 is welded or otherwise secured to the portion 20. Thus, the entire deep well cooker is supported on the bottom wall of the rabbet 15. The bottom of the tubular side wall 19 is closed by a plate 22 which may or may not be integral with the side wall 19.

Figure 2:
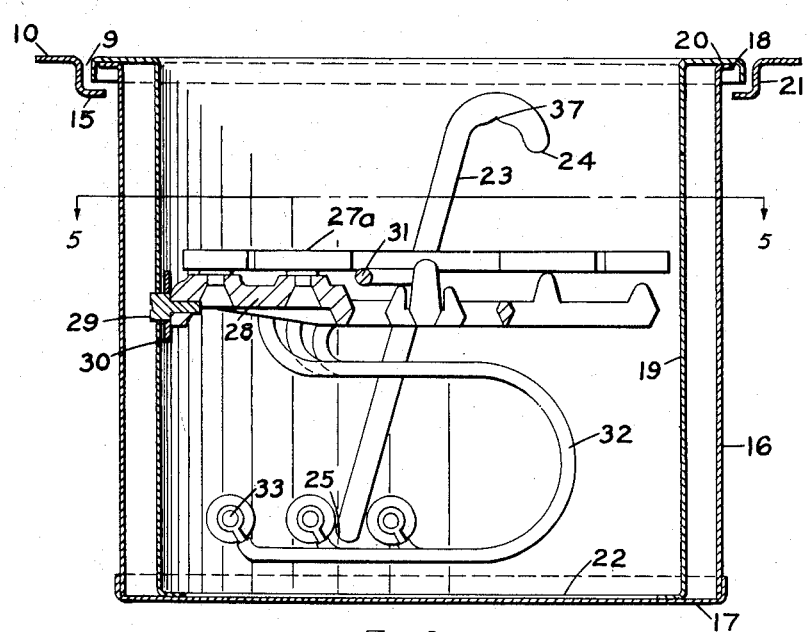
Figure 2 is a fragmentary cross-sectional view taken on substantially the line 2—2 of Figure 1.

Spaced about the side wall 19 are three guideways 23 for the burner. The guideways 23 may be formed in various ways, but in the preferred form shown they are slots cut in the side wall 19. The slots are inclined upwardly from their lower ends to points adjacent their upper ends. The upper portions of the slots curve laterally and downwardly as shown in Figure 2. The extremities of the slots thus form upper burner supporting seats 24 and lower burner supporting seats 25, as will more clearly appear presently. The portions of the slots intermediate such seats form the guideways 23 to guide the burner 27 in its movement between the seats 24 and 25.

As above mentioned, the upper portions of the guideways 23 curve laterally and downwardly to the seats 24. The upper edge of each guideway in this zone is semi-circular. The corresponding lower edge is provided, directly beneath the highest part of the upper edge of the guide, with an upwardly extending projection 37. The sides of the projection 37 curve downwardly and outwardly. The purpose of this particular configuration of the upper portions of the guideways will appear later.

The sleeve 16 and the tubular wall 19 are spaced apart radially, and the slotted guideways 23 are sealed off from the major portion of the space between the parts 16 and 19 by means of three channel shaped spacers 26. See particularly Figure 5. The legs of the channel shaped spacers 26 are preferably welded to the outside of the tubular side wall 19.

The burner 27 includes a pair of heating elements 27a and a supporting frame 28. The heating elements may be of conventional construction. The heating elements 27a are secured to the frame 28 so as to move therewith. The frame 28 is of generally triangular configuration with truncated apexes. Preferably the frame 28 is a metal casting.

The means for supporting the burner on the seats 24 and 25 comprises three guides in the form of studs 29. The studs 29 have cylindrical heads 35 and shanks 36 of somewhat reduced cross-section. The shanks 36 are threaded and are received in tapped openings in the apexes of the frame 28. The lengths of the studs 29 are such that when assembled each stud extends through a corresponding guideway 23 and cooperates with the latter in guiding the frame and burner in its upward and downward movement.

It will be noted that the frame 28 is so constructed that the apexes thereof are spaced slightly from the tubular side wall 19. An annular disk or washer 30 surrounds the head 35 of each stud 29 and is rotatably mounted thereon. The washers 30 engage the apexes of the frame 28 and also engage the tubular side wall 19 at circumferentially spaced points on opposite sides of the guideways 23. Because of the cylindrical configuration of the tubular side wall 19, the washers 30 engage the wall 19 at only those two circumferentially spaced points and are spaced from the wall 19 above and below the heads 35 of the studs 29. The washers 30 act as antifriction elements so that the burner can be freely raised and lowered and also assist in maintaining the burner in a horizontal position during its raising and lowering movement, as will be more fully pointed out presently.

Figure 3:
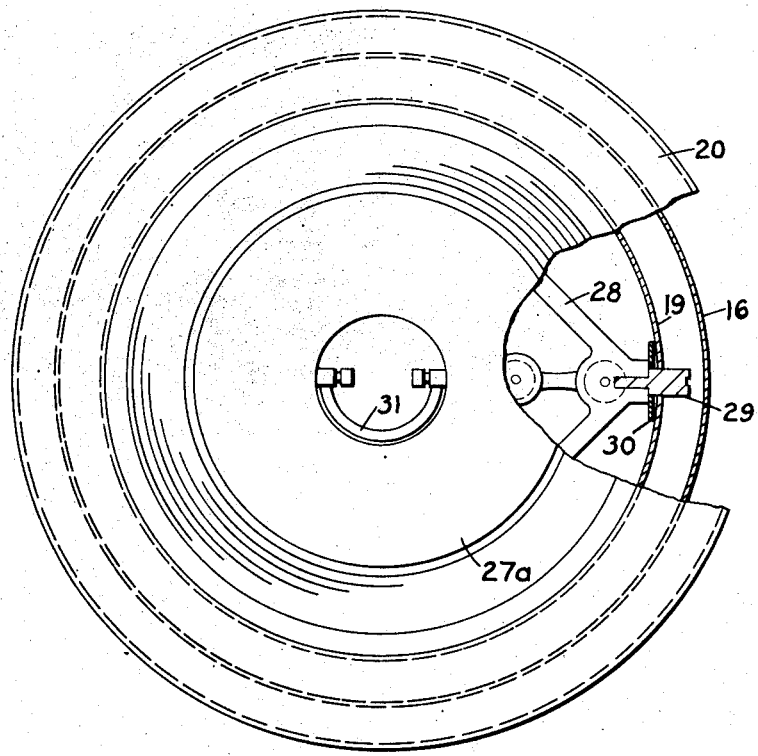
Figure 3 is a plan view of the deep well cooker construction, parts being broken away to more clearly disclose the construction thereof.

The burner frame is provided with a handle 31 which when not in use assumes a horizontal position, as shown in Figures 2 and 3. The handle 31 can be raised to a vertical position when it is desired to raise or lower the burner.

The heating elements 27a in the burner 27 are connected by means of suitable electrical conductors 32 to three terminals 33 extending through and attached to the tubular side wall 19 in the sleeve 16. The conductors 32 are insulated preferably by the type of insulation disclosed in my aforesaid copending application.

It will be understood from the foregoing that the burner 27 is intended to assume two positions. One position is at the upper end of its movement wherein the studs 29 rest upon the seats 24 and thus hold the burner in a position where it can be used as a typical surface burner. In the other position of the burner the studs 29 rest upon the seats 25 at the lower ends of the guideways 23 and in this position the burner acts as a burner for a deep well cooking pan or pot (not shown) in the usual manner. The burner is raised from its lower to its upper position by grasping the handle with the hand or with a suitable hook-shaped tool and pulling upwardly. Due to the inclined configuration of the guideways 23 and the arcuate shape of the upper ends of the latter, the burner is rotated a limited distance about its vertical axis and cammed into position upon the seats 24.

The particular configuration of the upper portion of the guideway 23 previously described; namely, the semicircular upper edge and the projection 37 on the lower edge; causes the burner to seat itself on the upper seat 24 when the burner is being raised from the lower seat 25 and nears the upper limit of its travel, and to unseat the burner and move it to a position to be lowered when the burner is raised a predetermined distance from the upper seat. Thus, when the burner is moved upwardly from the lower seat the studs 29 follow the inclined guideways until they strike the curved upper edges thereof, and are then moved circumferentially of the side wall 19. The inertia of the rotating burner will carry the studs slightly beyond the uppermost parts of the arcuate edges, or past dead center, as it were, and clockwise (as viewed in Figure 5) beyond the projections 37. The burner is then in such a position that it can be lowered onto the upper seats, during which movement the studs 29 slide down the sides of the projections 37 nearest the seats 24 onto the latter.

In lowering the burner it is first moved from the upper seats, which movement rotates the burner counter-clockwise and carries the studs past the other sides of the projections 37. The burner can then be lowered and it will be guided downwardly to the lower seats 25.

Figure 7:
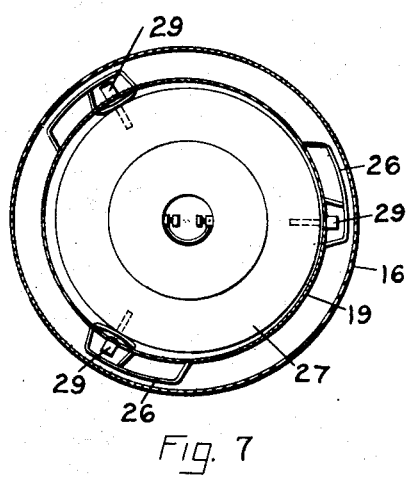

It is essential that the burner be maintained in substantially a horizontal position at all times during its upward and downward movement. This result is necessary in order that the burner may move freely and that the heads 35 of the studs 29 will not pull out of the guideways 23. The horizontal position is maintained by the mutual contribution of the inclined guideways 23 and the washers 30. As will be noted from Figure 7, if the burner should tilt from its horizontal position, either by accident or design, the stud 29 on that portion of the periphery of the burner which tends to rise above the remainder of the burner will be moved laterally slightly due to the camming effect of the inclined guideway in which the aforementioned stud moves. That will cause the entire burner to assume a slightly eccentric position, as seen in Figure 7. Such eccentricity can never become very great because a portion of the periphery of the burner will contact the corresponding portion of the tubular side wall 19. If the guideways 23 were vertical throughout substantially their entire extent, this tendency of the burner to take a position of eccentricity relative to the tubular side wall 19 would not be produced, and unless otherwise permitted, the heads of the studs might pull out of the corresponding guideways.

Figure 6:
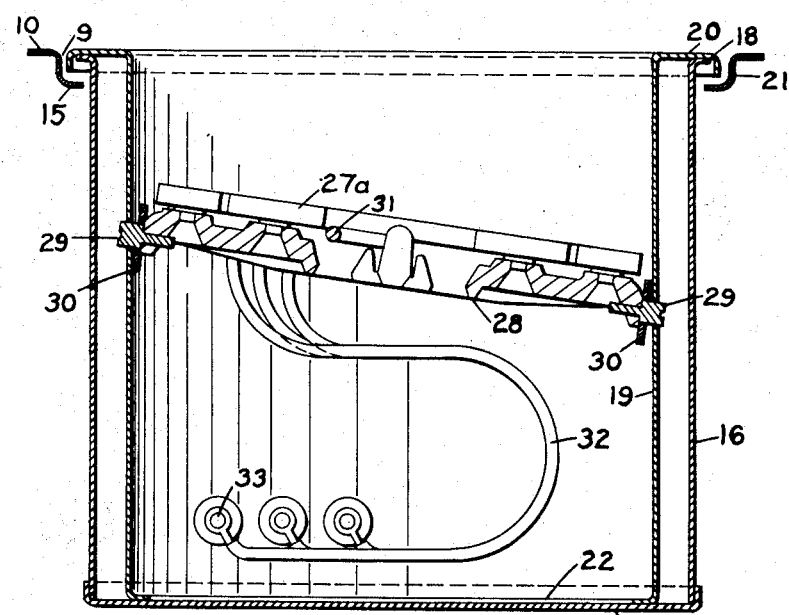
Figures 6 and 7 are, respectively, a cross-sectional view taken on substantially the line 6—6 of Figure 5 and a plan view of the burner, illustrating in a somewhat exaggerated manner the tendency of the burner to tilt while being moved, and the means for substantially preventing such tilting.

The inclination of the guideways is alone sufficient to prevent the heads of the studs from escaping from the guideways, but with that feature only there is a tendency for the burner to bind against the side wall if the burner is tilted. The washers 30 eliminate the tendency to bind, and also assist in preventing the studs from moving out of the guideways. Figure 6 illustrates the results obtained by the employment of the washers 30. As will be seen in that figure, if the burner tends to tilt, the lowermost part of the washer on the high side of the burner moves toward the burner side wall, while the upper portion of the same washer moves away from the side wall. On the other hand, the upper portions of the other washers tend to engage the burner side wall 19. This effect is little more than a tendency, however, due to the manufacturing tolerances in the side wall 19, the burner frame 28, and the washers 30. Thus, any appreciable tilting of the burner is prevented by the washers. The washers can rotate about the studs 29, thereby producing a rolling contact between the washers and the side wall 19 and minimizing friction between burner and side wall.

These two anti-tilting features together maintain the burner in a very nearly horizontal position, yet completely prevent any binding between the burner and the side wall 19 in which the burner moves.

Figures 4, 8:
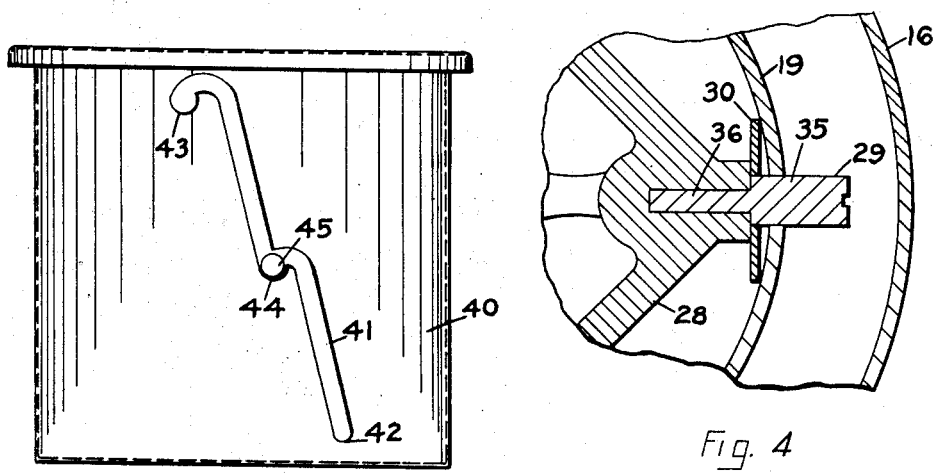
Figure 4 is a fragmentary cross-sectional view showing a portion of the structure shown in Figure 3 on an enlarged scale.
Figure 8 is a side elevational view of a modified form of the invention.

Figure 8 discloses a slightly modified form of the present invention. The construction of the burner is identical with that of the burner previously disclosed. The only part of the entire structure which is different from that described heretofore is the side wall, which is designated by the numeral 40. The side wall 40 is provided with three guideways 41, of which only one is shown. These guideways are in the form of slots cut in the burner side wall. The guideways 41 are formed, however, to provide an intermediate seat for the burner, so that if desired a deep well cooking pot of less capacity and less depth than the regular deep well pot may be employed. The guideways 41 are provided with bottom burner seats 42 and upper burner seats 43, just as those previously described. Intermediate the ends of the slot the latter bends laterally and downwardly to provide seats 44.

As will be apparent from this brief description, a burner which is provided with studs 45 which move in the guideway 41 can be placed in any one of three positions, namely, a lower position wherein the studs rest on the seats 42, an intermediate position where the studs rest on the seats 44, and a raised or surface burner position wherein the studs rest in the seats 43.

From the foregoing it will be apparent that the present invention provides an extremely simple and economical form of deep well cooker in which the burner can be readily raised and lowered without any tendency for it to bind within the side wall in which it is received. Furthermore, the particular configuration of the upper ends of the guideways eliminate the necessity to manually rotate the burner when seating it or unseating it from its uppermost position.

The scope of the invention is indicated in the appended claims.

I claim:

1. In a cooking appliance structure, a shell member, a burner member disposed in said shell member for upward and downward and rotary movement, and means for releasably supporting said burner in the upper portion of said shell where it serves as a top burner, said means comprising cooperating studs and guide slots in said members, said guide slots extending upwardly toward stud seats and each having its upper portion turned abruptly laterally and inwardly to form a reverse bend and providing a stud seat spaced from the mid-portion of said reverse bend by a distance at least equal to one-half the width of the slot adjacent said seat, said stud seat having upper and lower surfaces, each of said surfaces being arcuate and formed to provide positive guide means for said stud away from said seat.

2. In a cooking appliance structure, a shell member, a burner member disposed in said shell member for upward and downward and rotary movement, and means for releasably supporting said burner in the upper portion of said shell where it serves as a top burner, said means comprising cooperating studs and guide slots in said members, said guide slots being inclined in a generally-vertical direction and each having its upper portion turned abruptly laterally and inwardly to form a reverse bend and providing a stud seat spaced from the mid-portion of the reverse bend by a distance at least equal to one-half the width of the slot adjacent said seat, said slot forming guides on both sides of said reverse bend and extending downwardly and outwardly therefrom.

3. In a cooking appliance structure, a shell member, a burner member disposed in said shell member for upward and downward and rotary movement, and means for releasably supporting said burner in upper, lower, and intermediate positions, said means comprising cooperating projection and guide slot means in said members, said guide slot extending upwardly at an inclination and being turned laterally at an intermediate point to provide a projection seat for supporting said burner at an intermediate point.

4. In a cooking appliance structure, a tubular shell, a burner member disposed in said shell for upward and downward and rotary movement, said shell being provided with a guide slot which extends upwardly at an inclination away from the vertical, said slot being turned laterally at its top to provide a top burner seat and being turned laterally at an intermediate point to provide an intermediate burner seat, said slot after being turned laterally to provide an intermediate burner seat being extended in a plane offset from said portion of the slot below said intermediate seat and rising directly from said intermediate seat and toward the upper burner seat, and stud means carried by said burner and engaging said guide slot.

References Cited in the file of this patent

UNITED STATES PATENTS

| Number | Name | Date |
|---|---|---|
| 1,695,407 | Anderson | Dec. 18, 1928 |
| 1,695,625 | Wild | Dec. 18, 1928 |
| 2,043,890 | Florman | June 9, 1936 |
| 2,107,444 | Kasdan et al. | Feb. 8, 1938 |
| 2,416,645 | Rutenber | Feb. 25, 1947 |
| 2,481,227 | Kuenne | Sept. 6, 1949 |
| 2,485,698 | Chesser et al. | Oct. 25, 1949 |
| 2,485,990 | Snow | Oct. 25, 1949 |